June 17, 1947.  C. D. STEWART  2,422,597
PIPE FITTING
Filed Nov. 25, 1944
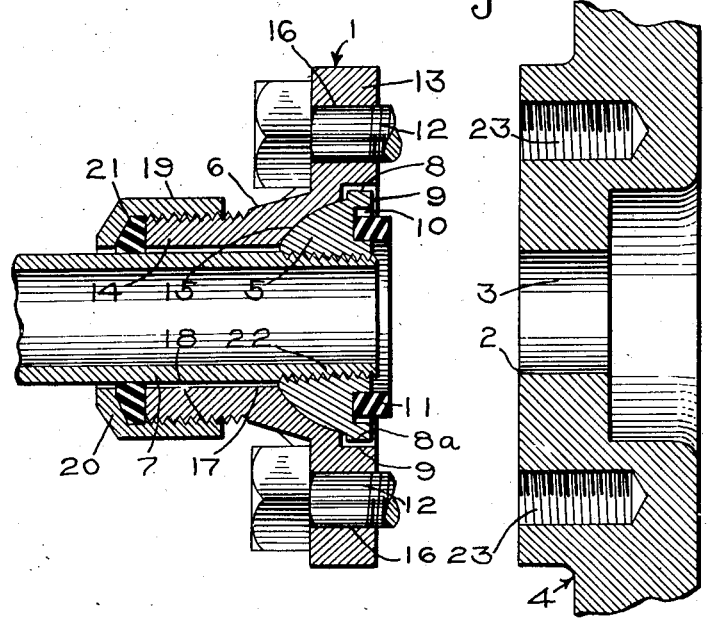
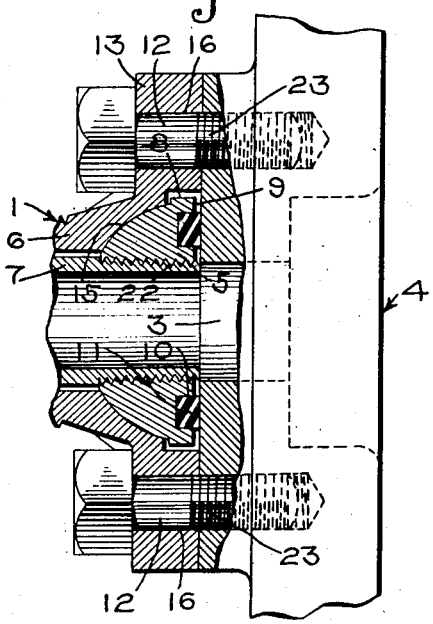
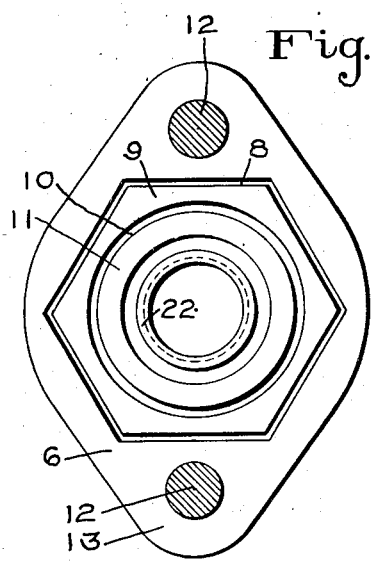
INVENTOR.
Carlton D. Stewart
BY
ATTORNEY Patented June 17, 1947

2,422,597

UNITED STATES PATENT OFFICE 2,422,597

PIPE FITTING

Carlton D. Stewart, Wilkinsburg, Pa., assignor to The Westinghouse Air Brake Company, Wilmerding, Pa., a corporation of Pennsylvania Application November 25, 1944, Serial No. 565,080

8 Claims. (Cl. 285—25)

This invention relates to pipe fittings and in particular to pipe fittings for securing a pipe section to a device or element having a passage with which the pipe is to communicate.

An object of this invention is to provide a connection between a pipe section and a device having a passage which is open to the pipe section, which connection will be resilient enough to prevent breakage of the pipe as a result of vibration and yet will effect a fluid-tight communication between said pipe and said device.

Another object is to provide a pipe fitting which resiliently supports the pipe at a point remote from its threaded end so as to relieve the strain on the thinner walled threaded section.

Another object is to provide a resilient pipe fitting which permits a limited amount of rocking movement of the pipe about its end and thus prevents the localizing of bending moments in the pipe especially at a point located near its end or near a support for the pipe.

Another object is to provide a pipe fitting which will attain the above mentioned objects and which may be applied to or removed from the pipe with the use of an ordinary wrench without danger of distorting the pipe.

To attain these objects a ball and socket arrangement is provided, of which the ball portion, through the medium of an annular gasket, makes a joint between a pipe and a device or element while the socket portion provides the mounting means for effecting and maintaining the joint. The socket portion is provided with a sleeve which encircles the pipe and extends in a direction away from the joint. A resilient annular member is held in engagement with the end of the sleeve and the periphery of the pipe by means of a collar which has screw-threaded engagement with said sleeve. Thus the pipe may rock about its end against the opposing force exerted by the resilient gasket and the annular member while a positive metal to metal mounting and fluid-tight seal is maintained.

In the accompanying drawing, Fig. 1 is a longitudinal sectional view of a pipe fitting embodying features of the invention, which fitting is shown associated with the mounting face of a device and in position to be connected to said device; Fig. 2 is an end elevational view of the fitting shown in Fig. 1; and Fig. 3 illustrates the fitting and the mounting face of Fig. 1 secured in cooperative relationship.

Referring to Fig. 1 of the drawing, the pipe fitting which is indicated generally by the reference numeral 1 is shown ready to be secured to the mounting face 2 surrounding a fluid conducting passage or conduit 3 in a device or element 4, which device may constitute a part of a fluid pressure brake equipment to which fluid under pressure may be supplied and/or from which fluid under pressure may be discharged, such as a reservoir, a brake cylinder or a brake controlling valve device.

The fitting 1 comprises a member 5 which is in the form of a segment of a sphere and is made of a suitable metal such as brass. The fitting also comprises a metallic mounting flange member 6 having a recess or socket 15 formed therein for receiving the member 5, the member 5 having screw-threaded or other suitable connection with the end of a pipe 7.

The spherical portion of the member 5 is provided at one end with an integral hexagonal portion 8 as best seen in Fig. 2 to which a wrench may be applied for screwing the member onto the pipe 7 or for holding the member while the pipe is being screwed therein. This hexagonal portion is provided with a flat end face 9 in which there is formed, so as to encircle the pipe 7, an annular groove or recess 10 into which a compressible packing ring or gasket 11 is introduced.

It is preferred that the width of the recess 10 be slightly greater than the width of the packing ring 11 and that the thickness of the packing ring be slightly greater than the depth of the recess when the fitting is uncoupled as shown in Fig. 1 so that when the flange member 6 is drawn, by the bolts 12, into engagement with the mounting face 2 the material of the ring will flow into the recess as shown in Fig. 3.

The flange member 6 comprises a flange portion 13 and a sleeve portion 14, the recess or socket 15 being open to the clamping face of the flange portion. The recess or socket 15 is shaped so as to accommodate the entire segment member 5. It should be noted however that, while the corresponding spherical surfaces are to be fitted snugly for the purpose of effecting a positive metal-to-metal contact, that portion of the recess or socket 15 which accommodates the hexagonal portion of the member 5 is hexagonal in shape and of slightly greater dimensions than those of said hexagonal portion, the clearance space between the hexagonal portion and the walls of the recess or socket being sufficient to permit slight movement of the member 5 relative to the member 6 such as the movement which may occur when the pipe is caused to vibrate. This clearance space however will not be great enough to permit any material rotation of the pipe and member 5 about their axes. The flange portion 13 is also provided with holes 16 for receiving the mounting bolts 12 hereinbefore mentioned.

The sleeve portion 14 of the flange member 6 is provided with an axial bore 17 and at its inner end is open to the recess 15, the pipe 7 extending through this bore 17. It should be understood that the space between the outer wall of the pipe 7 and the wall of the bore 17 of the sleeve portion 14 is greater than that ordinarily necessary to facilitate assembling so as to permit a limited relatively free movement of the pipe 7 in any direction at an angle to its axis.

For the purpose of supporting the pipe 7 at a point remote from its inner end the left hand end of the sleeve portion 14, as viewed in Fig. 1, is provided with a supporting construction which comprises a hollow nut 19 having screw threaded connection with the threaded outer end portion 18 of the sleeve 14. The left hand end of this nut 19 is turned inwardly to within a short distance of the outer surface of the pipe 7 so as to form an end wall 20, the inner surface of which is tapered. Interposed between the inner surface of the wall 20 and the left-hand end of the sleeve portion 14 for compression therebetween is a ring 21, which ring is formed of a resilient material so that when compressed in a direction longitudinal of the pipe 7 it exerts a yieldably supporting force radially inward on said pipe.

In assembling the fitting 1 and securing the fitting to the device 3, the nut 19, ring 21 and flange member 6 are passed over the end of the pipe 7 far enough to expose the threaded end 22 of the pipe. The pipe 7 is then held stationary while the member 5 is screwed onto the threaded end 22 of the pipe to the position in which it is shown in Figs. 1 and 3. Following this, the bolts 12 are passed through the holes 16 of the flange portion 13 and screwed into threaded sockets 23 provided in the mounting face 2 of the device or element 4, thereby bringing the flange portion 13 of the flange member 6 into metal-to-metal engagement with the mounting face 2 as shown in Fig. 3. This order of procedure is preferred so as to insure proper compression on the gasket 11 and a close fit of the spherical surfaces of the recess 15 and member 5 for the desired metal-to-metal support at the end of the pipe. The collar 19 is then threaded over the end of the sleeve portion 14 of the flange member 6 so as to squeeze the ring 21 radially inward against the pipe 7 enough to yieldably retain the pipe in axial alignment at this point. The various parts will now be assembled to make a joint such as that illustrated in Fig. 3.

Referring now to Fig. 3 it will be noted that there is a space between the flat face 9 of the member 5 and mounting face 2 of the element 4 into which the gasket 11 may flow in response to a longitudinal shock in the direction of the mounting face as well as in response to angular movement of the pipe and member.

It is well known that certain piping carried by railway vehicles will vibrate as a result of the service shocks to which it is subjected. When such piping is rigidly secured in the usual manner to a rigidly mounted element it has been observed that these vibrations are sometimes localized in a bending moment about a point in the pipe immediately in advance of the rigidly mounted element. In a relatively short time these continuous vibrations produce metal fatigue and ultimate fracture of the pipe. According to the present invention the flange member 6 is rigidly secured to the device or element 4 in metal-to-metal contact and the pipe 7 is secured to and supported by this member through the medium of the resilient ring 21 and member 5, the resilient gasket 11 maintaining the member 5 in close sliding contact with the flange member. It will be apparent therefore that the loose connection between pipe 7 and the rigidly mounted element 4 will permit yet yieldably resist movement of the pipe relative to the member and thus prevent vibratory bending of the pipe at some localized point, thereby preventing fracture or breakage of the pipe.

Having now described my invention, what I claim as new and desire to secure by Letters Patent, is:

1. In combination with an element having a fluid conducting conduit, a hollow flange member secured to said element, a pipe encircled by said flange member and being in open communication with said fluid conducting conduit, means rigidly attached to said pipe and slidably engaging said flange member to establish a pivotal connection between said pipe and flange member to permit angular movement of said pipe relative to said flange member, a support for said pipe carried by said flange member yieldable to the angular movement of said pipe, and resilient means interposed between and engaging said means and element for maintaining a yieldable fluid tight connection between said pipe and conduit.

2. In combination, with an element having a fluid conducting conduit, a hollow flange member secured to said element, a pipe encircled by said flange member and being in open communication with said fluid conducting conduit, means rigidly attached to said pipe slidably engaging said flange member to establish a pivotal connection between said pipe and flange member to permit angular movement of said pipe relative to said flange member, a support for said pipe carried by said flange member yieldable to the angular movement of said pipe, and resilient means interposed between and engaging said means and element for maintaining a yieldable fluid tight connection between said pipe and conduit, said resilient means yieldably resisting angular movement of said pipe.

3. In combination with an element having a fluid conducting conduit, a hollow flange member secured to said device about said passage, a pipe encircled by said flange member and being in open communication with said conduit, a member in the form of a portion of a sphere movably mounted in said flange member and establishing a yieldable connection between said pipe and flange member to permit angular movement of said pipe relative to the flange member, resilient means carried by said flange member and yieldable to said angular movement of said pipe, and a gasket interposed between and engaging said member and said element for maintaining a yieldable fluid-tight connection between said pipe and said conduit.

4. In combination with an element having a fluid conducting conduit, a hollow flange member secured to said device about said passage, a pipe encircled by said flange member and being in open communication with said conduit, a member in the form of a portion of a sphere movably mounted in said flange member and establishing a yieldable connection between said pipe and flange member to permit angular movement of said pipe relative to the flange member, resilient means carried by said flange member and yieldable to said angular movement of said pipe, and a gasket interposed between and engaging said member and said element for maintaining a yieldable fluid-tight connection between said pipe and said conduit, said gasket assisting said member to yieldably resist the angular movement of said pipe.

5. A pipe supporting structure for connecting a pipe to a fluid conducting conduit of a device, in combination, a flange member secured to said device, a member in the form of a portion of a sphere movably mounted in said flange member to permit angular movement of said pipe relative to said device, a resilient gasket interposed between and engaging said member and device so as to effect a yieldable fluid tight connection between said pipe and said conduit and to yieldably resist the movement of said member, and pipe support means secured to said flange member for yieldably retaining the pipe in axial alignment with said flange member.

6. In combination with an element having a fluid conducting conduit, a hollow metallic flange member secured to said element in metal to metal contact, a pipe encircled by said flange member and being in open communication with said fluid conducting conduit, metallic means pivotally supporting said pipe in said flange member in metal-to-metal engagement so as to permit angular movement of said pipe about its end in any direction, a resilient support for said pipe carried by said flange member, and resilient means interposed between and engaging said metallic means and element for maintaining a yieldable leak-proof connection between said pipe and conduit.

7. In combination with an element having a fluid conducting conduit, a hollow flange member secured to said element, a pipe encircled by said flange member and in open communication with said conduit, ball and socket means supporting said pipe in said flange member, said means including a portion of a ball having a polygonal flange spaced away from said element and said flange member so as to permit limited angular movement of said pipe in any direction, a support for said pipe carried by said flange member and yieldable to said angular movement of the pipe, and resilient means interposed between and engaging the ball portion and said element for maintaining a yieldable fluid-tight connection between said pipe and conduit.

8. In combination with an element having a fluid conducting conduit, a hollow flange member secured to said element, a pipe encircled by said flange member and in open communication with said conduit, means cooperating with said pipe and said flange member to establish a yieldable connection therebetween, said means including a non-rotatable element disposed in a pocket of said flange member and in spaced relation to said flange member and said element so as to permit limited angular movement of said pipe, a support for said pipe carried by said flange member and yieldable to said angular movement of the pipe, and resilient means interposed between and engaging said means and element for maintaining a yieldable fluid-tight connection between said pipe and said conduit.

CARLTON D. STEWART.

REFERENCES CITED

The following references are of record in the file of this patent:

UNITED STATES PATENTS

| Number | Name | Date |
|---|---|---|
| 1,862,153 | Lee | June 7, 1932 |
| 1,703,725 | Cromwell | Feb. 26, 1929 |
| 502,038 | Herman | July 25, 1893 |
| 1,603,579 | Budwell | Oct. 19, 1926 |

FOREIGN PATENTS

| Number | Country | Date |
|---|---|---|
| 384,716 | Great Britain | Dec. 15, 1932 |